(No Model.)

B. L. RANDALL.
HORSE RAILROAD SWITCH.

No. 296,062. Patented Apr. 1, 1884.

WITNESSES
Frank G. Parker
Helen M. Feegan

INVENTOR
Bellville L. Randall

UNITED STATES PATENT OFFICE.

BELLVILLE L. RANDALL, OF BOSTON, MASSACHUSETTS.

HORSE-RAILROAD SWITCH.

SPECIFICATION forming part of Letters Patent No. 296,062, dated April 1, 1884.

Application filed July 13, 1883. (No model.)

*To all whom it may concern:*

Be it known that I, BELLVILLE L. RANDALL, of Boston, in the county of Suffolk and State of Massachusetts, have invented certain new and useful Improvements in Horse-Railroad Switches, of which the following is a specification.

My invention relates to that class of horse-railroad switches in which the switch-points are so arranged and placed that the horses, by an oblique draft, may determine which track the car shall take, the object being to add to the heel of the switch a device which, being acted upon by the forward wheel of the car, shall throw the switch-point over, so that the rear wheel cannot get onto the wrong side of it and throw the car from the track. This object I attain by the mechanism illustrated in the accompanying drawings, in which—

Figure 1:
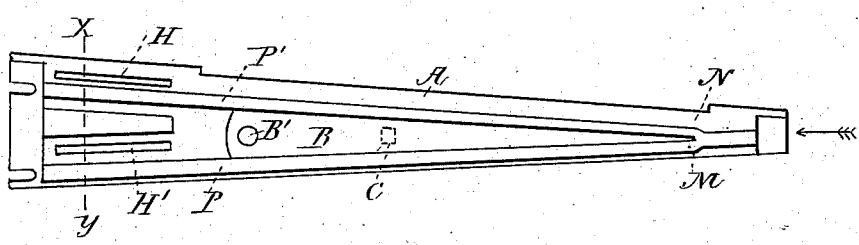
Figure 2:
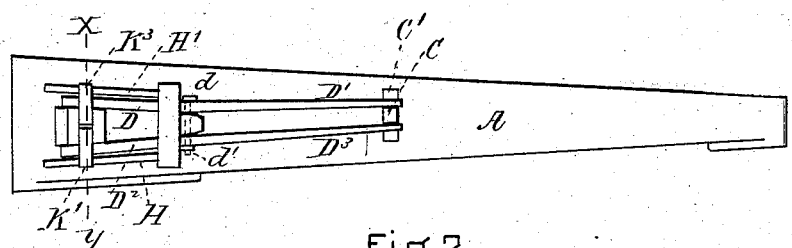
Figure 3:
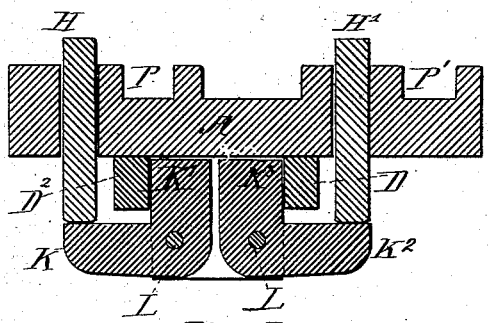

Figure 1 is a plan of my switch. Fig. 2 is a plan view of the under side of my switch, and Fig. 3 is a cross-section taken on the line $x\,y$ of Figs. 1 and 2.

In the drawings, A represents the body of the switch, and B the switch-point, which is pivoted at B', Fig. 1. From the under side of the switch-point I have a stout projecting post, C, Figs. 1 and 2, which passes through a slot made in the bed of the body of the switch, as shown at C', Fig. 2. The lower end of this post C is embraced by the ends of the spring-levers D D', $D^2$ $D^3$, Fig. 2. The spring-levers D D', $D^2$ $D^3$ are pivoted at $d$ and $d'$, respectively, and have their rear ends, D $D^2$, Figs. 2 and 3, resting against the arms K' $K^3$ of the bent levers K K', $K^2$ $K^3$, so that the spring-levers D D', $D^2$ $D^3$ are always acting against each other to hold the post C, and through it the switch-point B, in a central position—that is, in the position shown in Fig. 1—so that the forward wheel of a car entering the switch at the arrow, Fig. 1, may take either side of the point, as may be desired—the right or the left, as the horses are directed.

It is found in use that it is very easy to make the forward wheel take the desired side of the point, but that the rear wheel is inclined to take the opposite side, and thus to throw the car from the track. I will now explain how I avoid this difficulty. In the heel of the switch (at points about equal in distance from the toe to the distance between the forward and rear wheels of a car) I place, in slots made for them, two vertical plates, H H', so near the grooves P P' of the switch that the tread of the wheel in its passage will depress them, only one being depressed at a time. If H is depressed by the forward wheel of a car, it will act on the bent lever K K', pivoted at L, Fig. 3, and throw the end $D^2$, Figs. 2 and 3, of the spring-lever $D^2$ $D^3$ outward, thus causing its rod $D^3$ to push the switch-post C and the switch-point over toward the side M, Fig. 1, so that the rear wheel of the car must of necessity take the N side of the switch-point; and if the plate H' be depressed by the forward wheel of a car, then the switch-point will be thrown to the N side and the rear wheel will have to take the M side of the switch-point.

In the drawings, Fig. 1, the grooves P P' extend the entire length of the switch, and form a junction just beyond the moving end of the switch-point, and thence continue as a single groove to the end of the switch. The depth of these grooves P and P' is shown in section in Fig. 3. The upper surface of the switch-point B is on a level with the general top surface of the switch. In fact, the body of the switch and the switch-point B is made in the ordinary common well-known manner, and the spirit of my invention is involved in the adaptation of the plates H H', so that they may be actuated by the tread of the car-wheel and communicate the motion thus derived to the switch-point.

I am aware that switches have been used in which the points were operated by platforms depressed by the weight of the draft-animals. Of this well-known class of switches is the patent granted to Kneeland February 17, 1874, No. 147,655.

I am also aware that it is not broadly new to combine a pair of bars or plates adapted to be depressed by the tread of passing car-wheels with vertically-operating elbow-levers, horizontally-operating levers, and a switch-point, all of said parts being connected together, as shown in German Patent No. 7,686 of 1879, so that the switch-point will be shifted by depressing either one of said bars or plates. I therefore do not broadly claim such a combination; but

I claim—

In a horse-railroad switch, the combination of the switch-point B, having a downward-projecting post, C, the spring-levers D D', D² D³, the levers K K', K² K³, and the plates H H', adapted to be operated upon by the tread of the passing wheels, substantially as described, and for the purpose set forth.

BELLVILLE L. RANDALL.

Witnesses:
FRANK G. PARKER,
HELEN M. FEEGAN.